(12) United States Patent
Ohnishi

(10) Patent No.: US 11,036,274 B2
(45) Date of Patent: Jun. 15, 2021

(54) IMAGE PROCESSING APPARATUS AND METHOD FOR CONTROLLING SLEEP MODE AND OPERATION UNIT CLEARING BASED ON A HUMAN SENSOR

(71) Applicant: SHARP KABUSHIKI KAISHA, Sakai (JP)

(72) Inventor: Kazuyuki Ohnishi, Sakai (JP)

(73) Assignee: SHARP KABUSHIKI KAISHA, Sakai (JP)

(*) Notice: Subject to any disclaimer, the term of this patent is extended or adjusted under 35 U.S.C. 154(b) by 114 days.

(21) Appl. No.: 16/379,022

(22) Filed: Apr. 9, 2019

(65) Prior Publication Data

US 2019/0317586 A1    Oct. 17, 2019

(30) Foreign Application Priority Data

Apr. 12, 2018 (JP) .............................. JP2018-076931

(51) Int. Cl.

| | |
|---|---|
| *G06F 1/3231* | (2019.01) |
| *H04N 1/00* | (2006.01) |
| *G06F 1/3228* | (2019.01) |
| *G06F 1/3234* | (2019.01) |
| *G06F 9/451* | (2018.01) |
| *G06K 15/00* | (2006.01) |
| *G06F 1/3203* | (2019.01) |

(52) U.S. Cl.
CPC .......... *G06F 1/3231* (2013.01); *G06F 1/3228* (2013.01); *G06F 1/3284* (2013.01); *H04N 1/00896* (2013.01); *G06F 1/3203* (2013.01); *G06F 9/451* (2018.02); *G06K 15/4055* (2013.01)

(58) Field of Classification Search
CPC ...... G06F 9/451; G06F 1/3203; G06F 1/3228; G06F 1/3231; G06F 1/3284; G06K 15/4055; H04N 1/00896
USPC ...................................... 713/1, 323; 715/700
See application file for complete search history.

(56) References Cited

U.S. PATENT DOCUMENTS

| | | | | |
|---|---|---|---|---|
| 2006/0262349 | A1* | 11/2006 | Moroi | ................ H04N 1/00411 358/1.15 |
| 2011/0134251 | A1* | 6/2011 | Kim | ...................... H04N 5/232 348/164 |
| 2012/0204046 | A1 | 8/2012 | Baba et al. | |

(Continued)

FOREIGN PATENT DOCUMENTS

JP          5163761 B2     3/2013

*Primary Examiner* — Ji H Bae
(74) *Attorney, Agent, or Firm* — ScienBiziP, P.C.

(57) ABSTRACT

An image processing apparatus includes a human sensor, an operation unit for performing various settings, and a control unit capable of switching an operation mode between a normal mode and a sleep mode. In a case where no inputting from the operation unit occurs in a first set time, the control unit switches from the normal mode to the sleep mode. In a case where a human body is detected by the human sensor, the control unit switches from the sleep mode to the normal mode. In the normal mode, when the human sensor no longer detects a human body or the human sensor detects a human body leaving, the control unit clears a setting of the operation unit and starts counting down a second set time set for switching from the normal mode to the sleep mode.

6 Claims, 8 Drawing Sheets

(56) References Cited

U.S. PATENT DOCUMENTS

| | | | |
|---|---|---|---|
| 2013/0073885 A1* | 3/2013 | Hiramatsu | G06F 1/3231 |
| | | | 713/320 |
| 2013/0305069 A1* | 11/2013 | Goda | G03G 15/5016 |
| | | | 713/323 |
| 2014/0236728 A1* | 8/2014 | Wright | G06Q 30/0267 |
| | | | 705/14.58 |
| 2017/0104861 A1* | 4/2017 | Kang | G06K 9/00771 |
| 2019/0007567 A1* | 1/2019 | Omori | H04N 1/00403 |
| 2019/0109956 A1* | 4/2019 | Okubo | H04N 1/4433 |

* cited by examiner

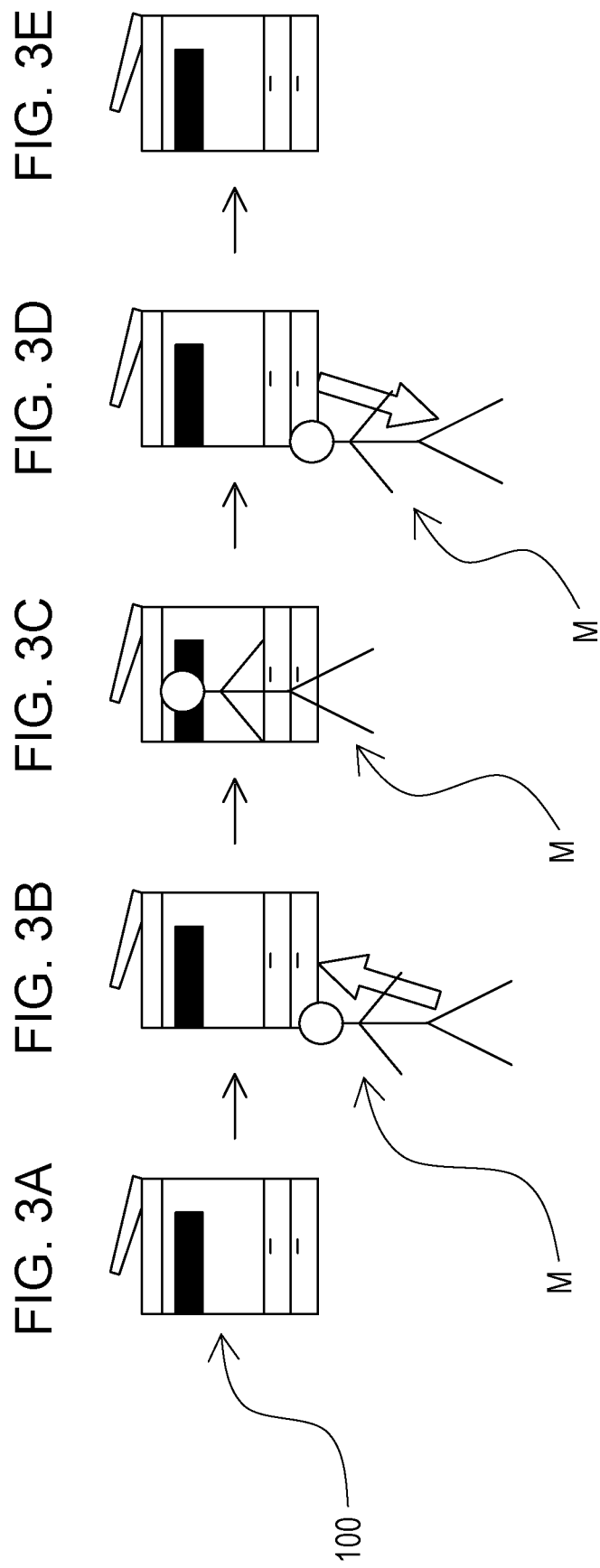

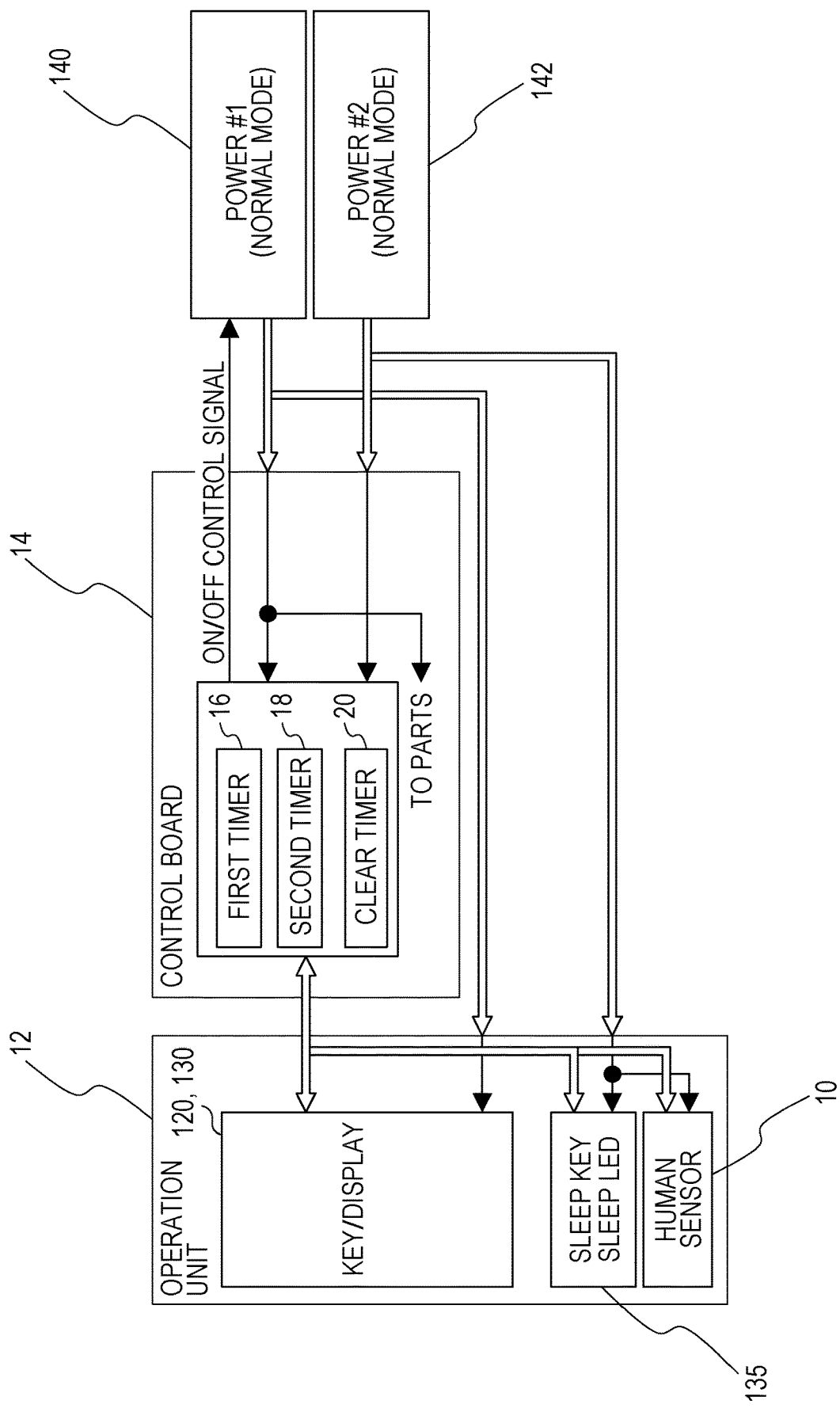

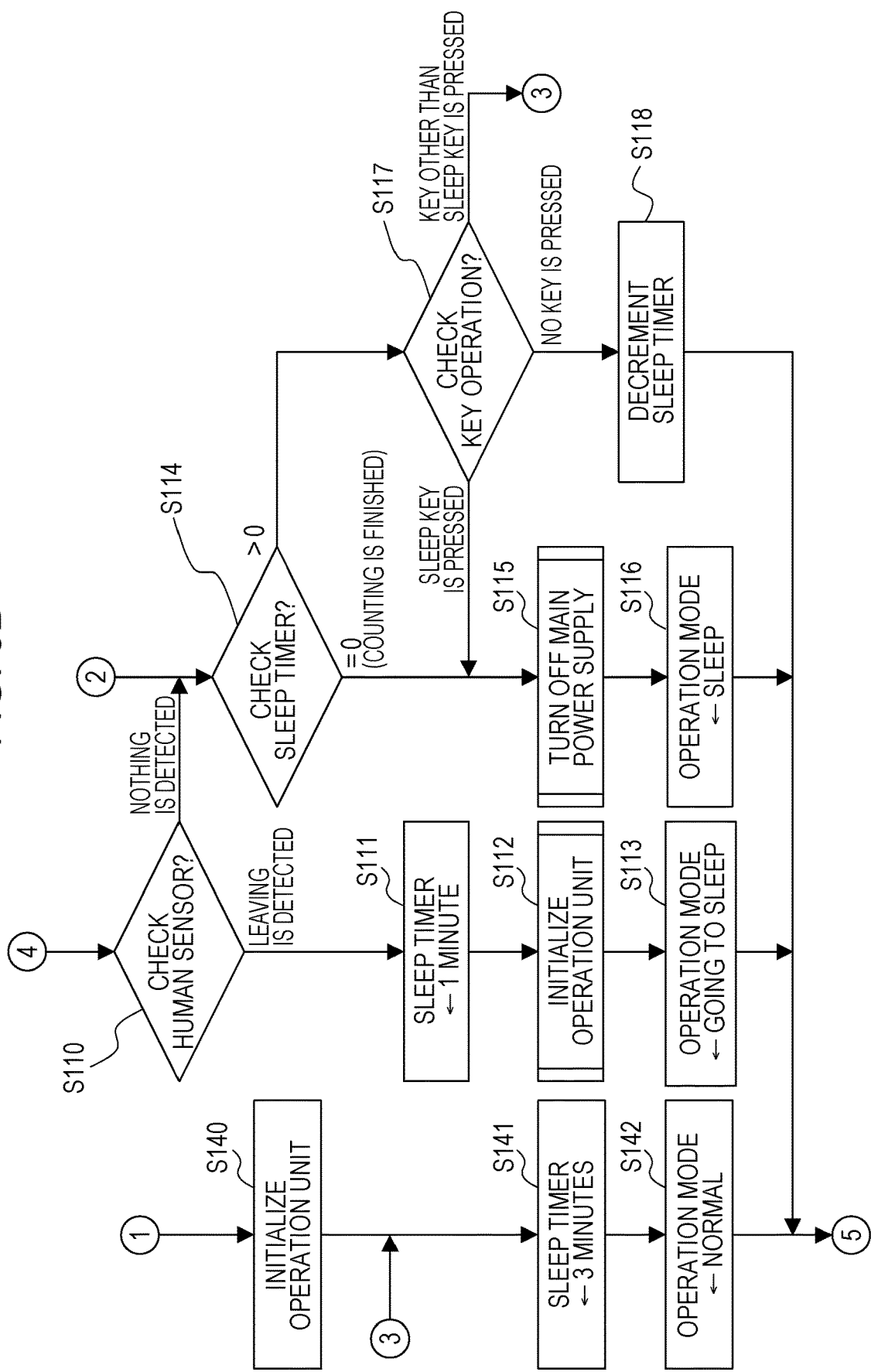

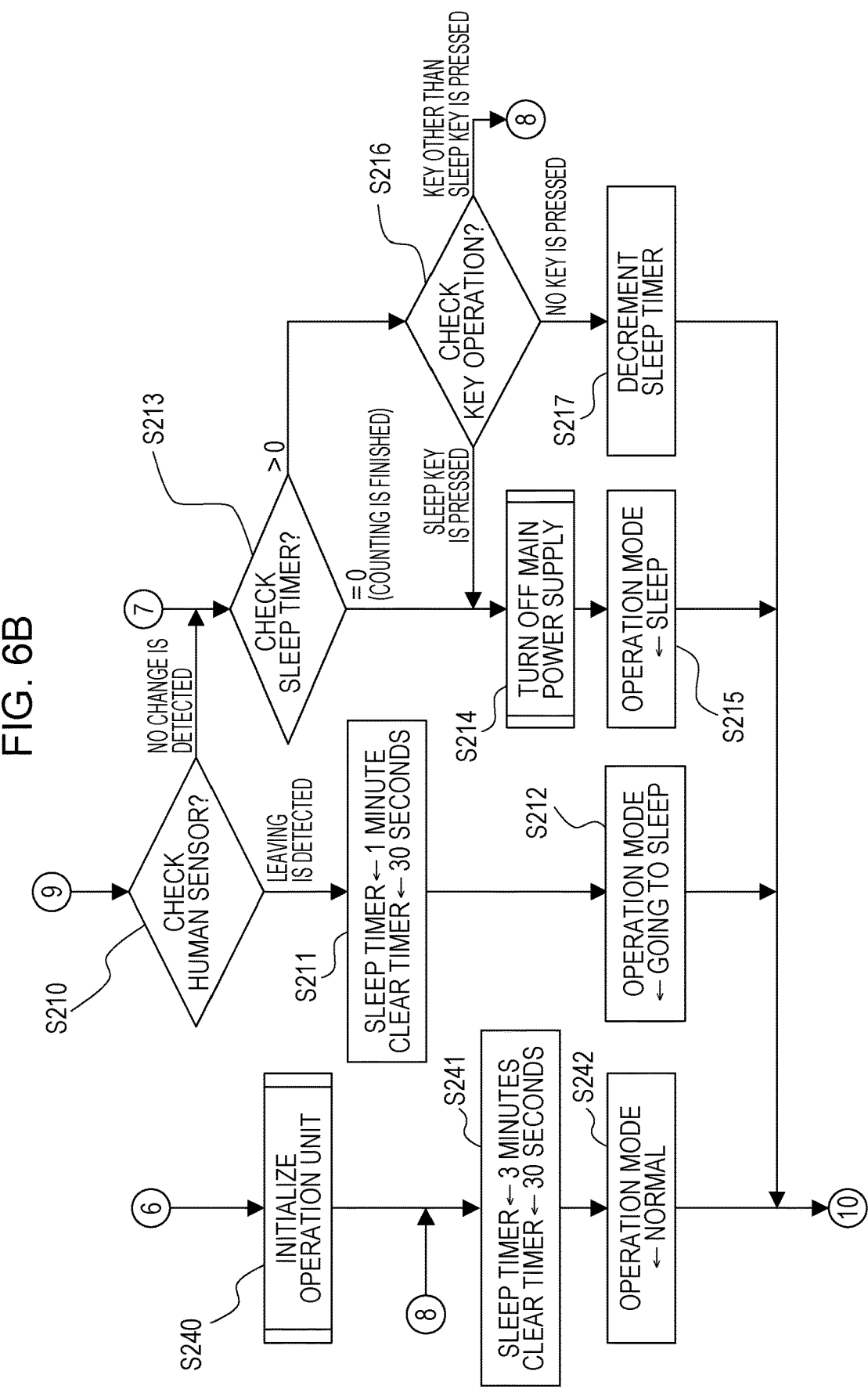

IMAGE PROCESSING APPARATUS AND METHOD FOR CONTROLLING SLEEP MODE AND OPERATION UNIT CLEARING BASED ON A HUMAN SENSOR

BACKGROUND

1. Field

The present disclosure relates to an image processing apparatus such as a copying machine and an image processing apparatus, and in more particularly, to an image processing apparatus that controls a sleep mode of the apparatus, and a method of controlling such an image processing apparatus.

2. Description of the Related Art

Some image processing apparatuses such as copying machines have a function of switching between a normal operation mode and a sleep mode, and include a human sensor using a pyroelectric sensor or the like. In such an image processing apparatus, when approaching of a human (a human body) is detected, the operation mode is automatically switched from the sleep mode to the normal mode before the operation of the image processing apparatus is started thereby reducing a waiting time for the operation mode to be switched to the normal mode. When no person is detected, the normal mode is switched to the sleep mode after a lapse of a predetermined time (see, for example, Japanese Patent No. 5163761).

In an image processing apparatus such as a copying machine or the like having no human sensor, when no operation is performed for a period with a predetermined length, settings made via an operation unit is cleared by an automatic clearing function.

In a case where an image processing apparatus is used such that a user starts to using the apparatus soon after a previous user lefts the apparatus, a change in person using the apparatus occurs in a period shorter than a time taken to switch to the sleep mode after a person leaving is detected by the human sensor, and thus the operation mode does not enter the sleep mode and the automatic clearing function does not operate. This can result in a problem that image forming such as copying or the like is performed in a wrong condition given by the setting made by a previous user.

In view of the above, the present disclosure provides an image processing apparatus and a method of controlling the image processing apparatus capable of controlling an operation such that in an operation performed after a previous user leaves the apparatus, a setting used in a previous operation is cleared before the operation is started.

SUMMARY

In an aspect, the present disclosure provide an image processing apparatus including a human sensor that detects a human body, an operation unit for performing various settings, and a control unit capable of switching an operation mode between a normal mode in which image processing is performed and a sleep mode in which consumption power is saved, the image processing apparatus further including a first count timer that, in a case where no inputting from the operation unit occurs in a first set time set in the first count timer, switches from the normal mode to the sleep mode, wherein in a case where a human body is detected by the human sensor, the control unit switches from the sleep mode to the normal mode, and wherein in the normal mode, in a case where the human sensor no longer detects a human body or the human sensor detects a human body leaving, the control unit clears a setting of the operation unit and starts counting down a second set time set in a second count timer for switching from the normal mode to the sleep mode.

In an aspect, the present disclosure provides a method of controlling an image processing apparatus including a human sensor that detects a human body, an operation unit for performing various settings, and a control unit capable of switching an operation mode between a normal mode in which image processing is performed and a sleep mode in which consumption power is saved, the method including, in a case where no inputting from the operation unit occurs in a first set time, switching from the normal mode to the sleep mode, in a case where the human sensor detects a human body, switching the sleep mode to the normal mode, and in the normal mode, in a case where the human sensor no longer detects a human body or the human sensor detects a human body leaving, clearing a setting of the operation unit and starting counting down a second set time set for switching from the normal mode to the sleep mode.

BRIEF DESCRIPTION OF THE DRAWINGS

FIGS. 3A to 3E are schematic diagrams illustrating an example of a manner in which a human sensor performs a detection operation according to an embodiment;

FIG. 4 is a block diagram illustrating a control system according to an embodiment;

FIGS. 5A and 5B are flow charts illustrating a control operation according to an embodiment; and FIGS. 6A and 6B are flow charts illustrating a control operation according to another embodiment.

DESCRIPTION OF THE EMBODIMENTS

Figure 1:
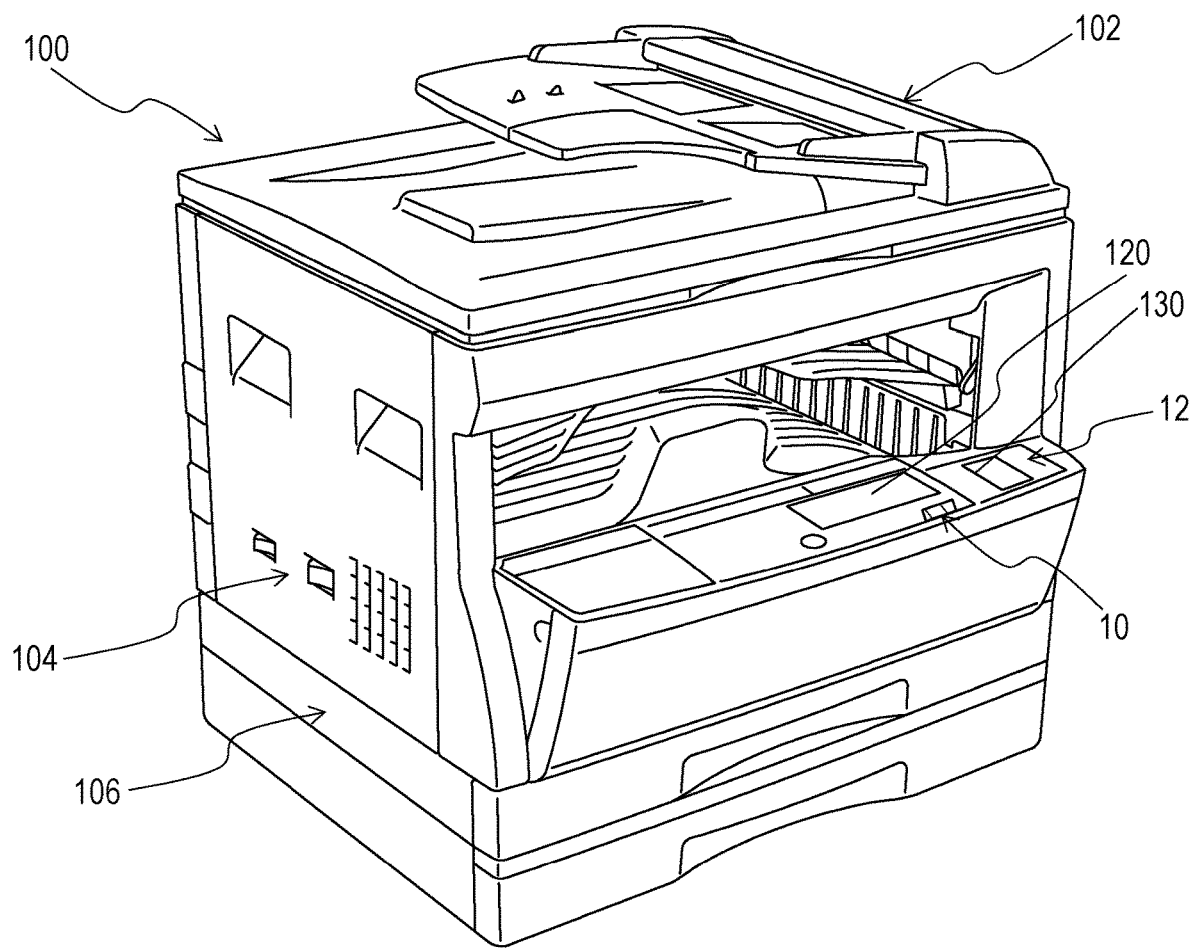
FIG. 1 is a schematic diagram illustrating an image forming apparatus according to an embodiment of the present disclosure.
Figure 2:
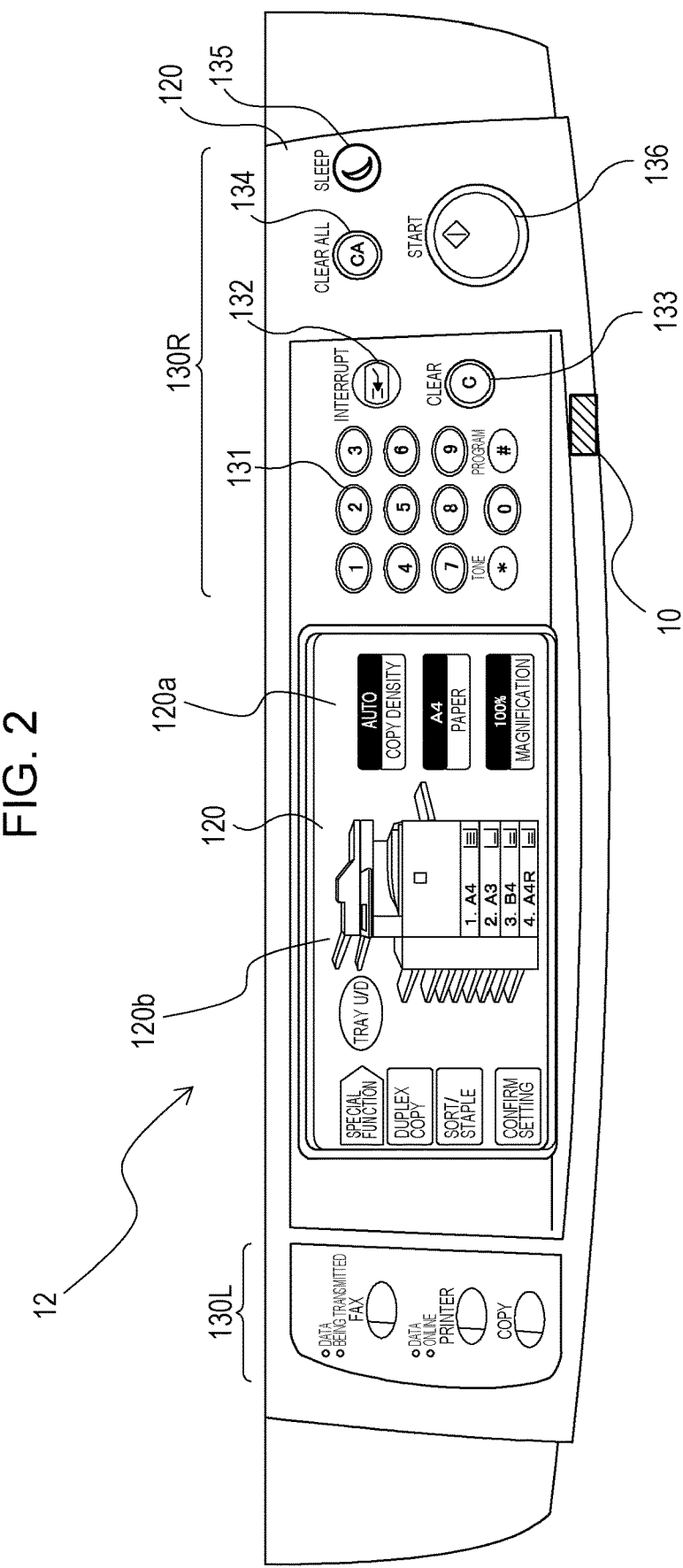
FIG. 2 is an enlarged diagram illustrating an operation unit according to an embodiment.
Figure 5A:
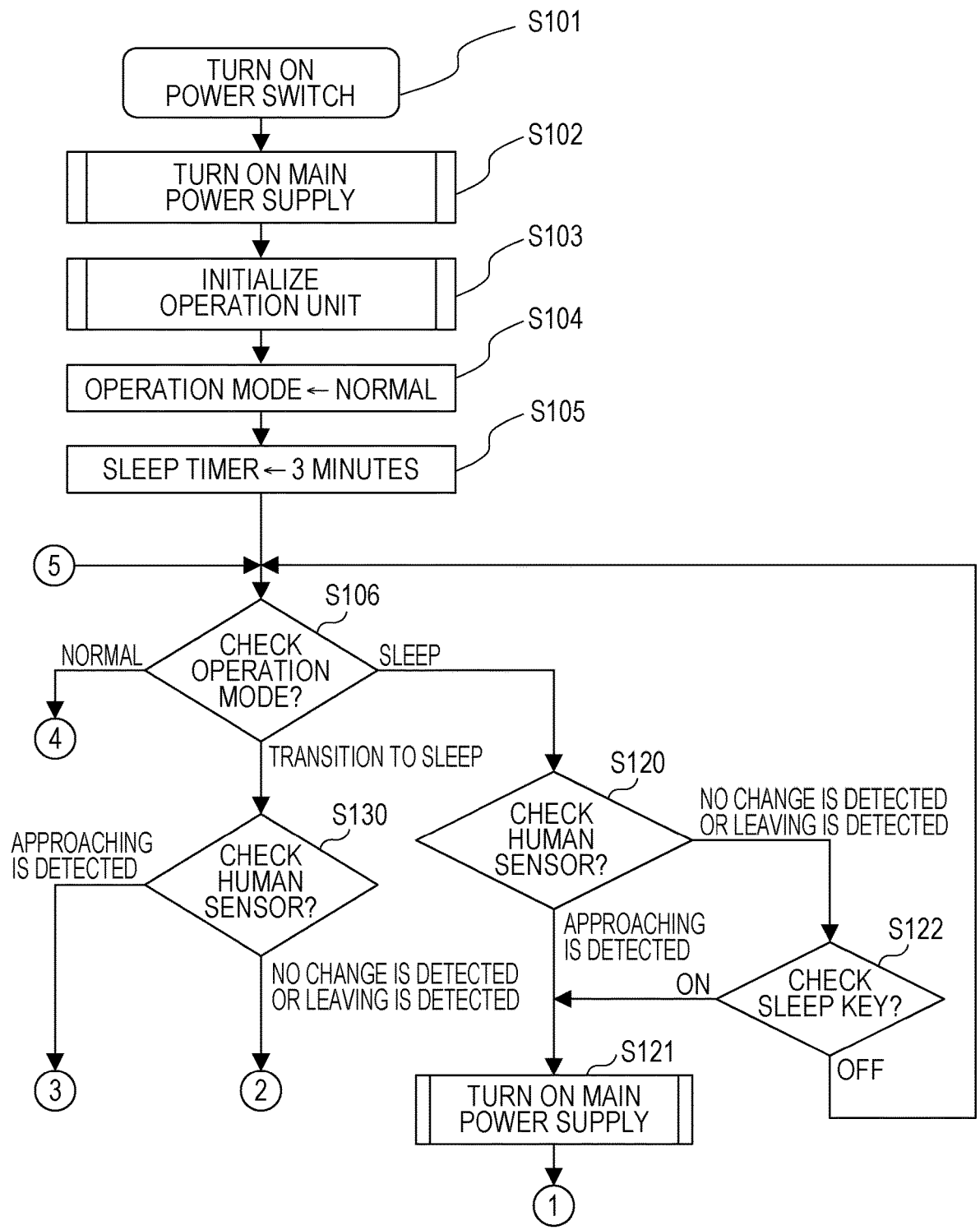

Embodiments of the present disclosure are described below with reference to accompanying drawings. FIG. 1 is a schematic diagram illustrating an image forming apparatus according to an embodiment of the present disclosure. FIG. 2 is an enlarged diagram illustrating an operation unit. FIGS. 3A to 3E are schematic diagrams illustrating an operation of a human sensor. FIG. 4 is a block diagram illustrating a control system. FIGS. 5A and 5B are flow charts illustrating a control operation according to an embodiment.

An image forming apparatus (which is an example of the "image processing apparatus") 100 according to an embodiment includes, as shown in FIG. 1, FIG. 2, and FIG. 4, a human sensor 10 for detecting a human body, an operation unit 12 for making various settings, and a control unit 14 capable of switching an operation mode between a normal mode in which an image processing is performed and a sleep mode in which consumption power is saved.

The operation unit 12 includes an operation panel 120 capable of being used in setting various items such as a printing condition of an image, and capable of storing the settings in the control unit 14.

The image forming apparatus includes, as shown in FIG. 4, a first count timer 16 used in switching the operation mode from the normal mode to the sleep mode in a case where no inputting from the operation unit 12 occurs within a first set time t1.

When the human sensor 10 detects a human body, the control unit 14 switches from the sleep mode to the normal mode. When the human sensor 10 no longer detects a human body, or the human sensor 10 detects a human body leaving, the control unit 14 clears a setting of the operation unit 12 and starts counting down a second set time t2 set in a second count timer 18 for switching from the normal mode to the sleep mode.

The image forming apparatus 100 forms an image on recording paper using an electrophotographic method. The image forming apparatus 100 has operation modes including a copy mode, a facsimile mode (a fax mode), and a network printer mode.

A basic configuration of the image forming apparatus 100 according to an embodiment is described below.

The image forming apparatus 100 includes, as shown in FIG. 1, a document reading unit (input unit) (hereinafter referred to as a "scanner unit") 102, an image forming unit 104 that forms an image on a recording medium based on image data input from the scanner unit 102, a paper feeding unit (paper supply unit) 106 that feeds paper, and an operation unit 12.

The operation unit 12 includes, as shown in FIG. 1 and FIG. 2, a switch set 130 and an operation panel 120 realized by a touch panel display. The operation panel 120 includes a display panel realized by a liquid crystal panel or the like, and a touch panel that is overlaid on the display panel and that detects a position pressed with a finger of a user. The switch set 130 includes switches with various configurations disposed on the upper surface of the operation unit 12. The operation unit 12 is formed on a front side of the image forming apparatus 100 such that the operation unit 12 slightly protrudes, and the operation panel 120 and the switch set 130 are formed on an upper face of the operation unit 12 such that a user is allowed to easily operate them while looking down on them. The human sensor 10 is disposed at a front end on the upper surface of the operation unit 12.

More specifically, as shown in FIG. 2, in the operation unit 12, various touch switches 120a for setting image forming conditions (copy density, paper type, magnification, duplex copy, sort, staple, setting confirmation, etc.) are located on the surface of the touch panel of the operation panel 120. On the surface of the touch panel of the operation panel 120, there is also a display surface 120b for displaying various kinds of information including a status of paper on a tray.

The switch set 130 is divided into two parts and displayed in a left-side area and a right-side area of the operation panel 120. A switch set 130L located on a left side as seen in FIG. 2 includes switches for selecting facsimile, print, and copy functions. A switch set 130R located on a right side as seen in FIG. 2 includes a ten-key pad 131 for setting the number of copies, an interruption key 132, a clear key 133 for clearing setting in terms of the number of copies or the like, a clear-all key 134 for clearing all settings, a sleep key 135 for setting the sleep mode and displaying a sleep status, and a start key 136 for issuing an image formation start command or the like.

Functions of the keys are similar to those of a common image forming apparatus. However, the sleep key 135 has an embedded LED that is lit when the image forming apparatus 100 is in the sleep mode to indicate that the image forming apparatus 100 is in the sleep mode. In the state in which this LED is on, only an inputting operation of the sleep key 135 is accepted and other keys are disabled to save power.

When the sleep key 135 is pressed down, the mode is changed from the sleep mode to the normal mode.

When no key operation is performed in a predetermined time period in the normal mode, the operation mode may enter the sleep mode. When any one of keys is pressed, the sleep timer is reset. When the sleep key 135 is pressed in the normal mode, the operation mode immediately enters the sleep mode.

Human Sensor 10

The human sensor 10 is disposed at the front end of the operation unit 12 as shown in FIG. 1. The human sensor 10 may be a pyroelectric infrared sensor including a pyroelectric element and a junction field effect transistor.

The pyroelectric element generates a charge in response to a small change in an infrared ray from a human body, which causes a change in the gate voltage of the junction field effect transistor, and thus a change occurs in the sensor output voltage V.

As shown in FIG. 3A, before a human body M comes near the image forming apparatus 100, the human body M is not detected and thus the human sensor 10 does not output the output voltage V. When the human body M approaches as shown in FIG. 3B, an infrared ray from the human body M is sensed, and a change occurs in the output voltage V.

Thereafter, if the human body M remains in front of the image forming apparatus 100 and the human sensor 10 is continuously illuminated by the infrared ray from the human body M as shown in FIG. 3C, a reduction occurs in the output voltage V of the human sensor 10.

Thereafter, when the human body M leaves the image forming apparatus 100 as shown in FIG. 3D, a further reduction in the output voltage V of the human sensor 10 occurs. In the following situation such as that shown in FIG. 3F which there is no human body M near the image forming apparatus 100, the output voltage V of the human sensor 10 returns to the original value which is the same as that in FIG. 3A.

As described above, there is a difference in a manner in which the output voltage V of the human sensor 10 changes between a situation in which the human body M approaches the image forming apparatus as shown in FIG. 3B and a situation in which the human body M leaves the image forming apparatus as shown in FIG. 3D. Therefore, by detecting the difference in the manner in which the voltage V changes, it is possible to detect whether the human body M is approaching or leaving the image forming apparatus.

In the image forming apparatus, as shown in FIG. 4, the control unit 14 includes a central processing unit (CPU) disposed on a control board.

In response to an operation signal input from the operation unit 12, the control unit 14 outputs an on/off control signal thereby turning on/off a first power supply 140 and a second power supply 142.

In the normal mode, the control signal supplied from the control unit 14 causes the first power supply 140 and the second power supply 142 to be turned on. On the other hand, in the sleep mode, the control signal supplied from the control unit 14 causes the first power supply 140 to be turned off and only the second power supply 142 to be turned on.

More specifically, in the normal mode, the first power supply 140 supplies power to the touch switch 120a and the display panel 120b of the operation unit 12, the CPU of the control unit 14, and other parts. Furthermore, the second power supply 142 supplies power to the control unit 14, the sleep key 135 and the indication LED, and the human sensor 10.

In the sleep mode, the first power supply 140 turns off, and the CPU operates in a power save mode with power supplied by the second power supply 142. In the sleep mode, in the operation unit 12, only the sleep key 135 and its indication LED and the human sensor 10 shown in FIG. 2 are allowed to operate with power supplied by the second power supply 142, but the other parts including the touch switch 120a and the display panel 120b in the operation unit 12 are disabled, and the display panel 120b displays no information.

The control unit 14 starts the first count timer 16 to switch the operation mode from the normal mode to the sleep mode when no signal from the operation unit 12 occurs in the first set time t1. When the human sensor 10 no longer detects a human body or the human sensor 10 detects a human body leaving, the control unit 14 clears the setting of the operation unit 12 and makes the second count timer 18 start courting for switching from the normal mode to the sleep mode. The first count timer 16 and the second count timer 18 are implemented by executing a program by the CPU. As described later in other embodiments, a function of a clear timer 20 is realized by executing a program by the CPU of the control unit 14.

Thus, in the image forming apparatus according to the present embodiment, when the human sensor no longer detects a human body or when the human sensor 10 detects a human body leaving, the settings of the operation unit 12 are cleared. Therefore, even in a case where shortly after a user finished his/her operation, another user starts his/her operation in front of the image forming apparatus 100, no problem occurs that may occur if the setting made by the previous user is maintained without being cleared. Instead of immediately switching from the normal mode to the sleep mode, the second count timer 18 starts counting for switching the mode, and thus the operation mode is not in the sleep mode when the next user wants to start using the apparatus.

Note that the first set time t1 set in the first count timer 16 may be different from the second set time t2 set in the second count timer 18. In this case, it may be preferable that toe first set time t1 from the operation unit 12 set in the first count timer 16 is longer than the second set time t2, set in the second count timer 18, from a detection result of the human sensor 10 to switching from the normal mode to the sleep mode. Thus, in the present embodiment, by way of example, the first set time t1 is set to 1 minute and the second set time t2 is set to 30 seconds (t1> t2).

When a user is detected leaving the apparatus, the setting of the operation unit 12 is cleared, and thus it is possible to avoid an operation from being performed by a next user using the setting remaining without being cleared. Also in a case where a user present in front of the apparatus does not perform any operation for a rather long time before making a decision, the counting of the short time t2 by the second count timer 18 is not started in response to leaving of the human body from the apparatus, but the rather long time t1 is counted down by the first count timer 16, and thus the setting of the operation unit is not cleared in a short time against the intention of the user.

FIGS. 5A and 5B are flow charts illustrating a control procedure of supplying power from the first power supply 140 and the second power supply 142 according to an embodiment (in FIGS. 5A and 5B, step 101 and the like is denoted simply as S101 and the like).

First, when the power switch of the image forming apparatus is turned on (S101), the first power supply 140 and the second power supply 142 are turned on (S102) (see FIG. 4), and power is suppled to the operation unit 12, the control unit 14, and other parts. Thereafter, the operation unit 12 is initialized (S103). The operation mode is set to the normal mode (S104), and the sleep timer is set to 3 minutes (S105). This corresponds to the setting in which first count timer 16 is used as the sleep timer and the first set time t1 thereof is set to 3 minutes.

Next, a determination is made as to whether the operation is in the normal mode, in the sleep mode, or in the transition-to-sleep crate (S106). In a case where it is determined that the operation is in the normal mode, the processing flow proceeds to S110. In a case where it is determined that the operation is in the sleep mode, the processing flow proceeds to S120. In a case where it is determined that the operation is in the transition-to-sleep state, the processing flow proceeds to S130.

Normal Mode

When it is determined in S106 that the operation is in the "normal mode", the output voltage V of the human sensor 10 is checked to determine whether a human body is detected (S110). In a case where it is determined in S110 that the human sensor 10 detects a human body leaving, the set time of the sleep timer is set to 1 minute (S111). More specifically, the second set time t2 of the second count timer 18 on the CPU is set to 1 minute. The set values stored in the operation unit 12 in terms of various operations are initialized (S112), and the operation mode is set to the transition-to-sleep state (S113). Thereafter, the processing flow returns to S106 to check the operation mode.

On the other hand, in a case where it is determined in S110 that no change is detected in the output voltage V of the human sensor 10, a determination is made as to whether the count of the sleep timer has reached the timeout limit (3 minutes set as the first set time t1 or the 1 minute set as the second set time t2) (S114).

In a case where it is determined in S114 that the set time of the sleep timer has expired (has reached the timeout), the first power supply 140 of the main power supply is turned off (S115). Thus, the operation mode is set to the sleep mode in which the control unit 14 is supplied only with power from the second power supply 142 and the CPU operates in the power save mode, and the second power supply 142 supplies power to the sleep key 135, the LED of the sleep key, and the human sensor 10 as shown in FIG. 4 (S116). Thereafter, the processing flow returns to S106 to check the operation mode.

On the other hand, in a case where it is determined in S114 that the sleep timer is not yet up (the set time of the sleep timer has not yet expired), a check is made as to an occurrence of a key operation (S117). In a case where a key operation of pressing the sleep key 135 is detected, the processing flow proceeds to S115 in which the main power supply (the first power supply 140) is turned off. In S116, the operation mode is set to the sleep mode. Thereafter, the processing flow returns to S106 to check the operation mode.

In a case where a key operation of pressing a key other than the sleep key 135 is detected in S117, the processing flow proceeds to S141 in which the sleep timer (the first count timer 16) is set to 3 minutes. In S142, the operation mode is set to the normal mode. Thereafter, the processing flow returns to S106 to check the operation mode.

In a case where no key operation is detected in S117, the sleep timer is decremented (S118). Thereafter, the processing flow returns to S106 to check the operation mode.

Sleep Mode

In a case where it is determined in S106 that the operation is in the "sleep mode", an occurrence of a change in the output voltage V of the human sensor 10 is checked to detect approaching or leaving of a human body (S120). In a case where approaching of a human body is detected by the human sensor 10, the processing flow proceeds to S121 in which the main power supply (the first power supply 140) is turned on. Thereafter, the processing flow, proceeds to S140 in which the operation unit 12 is initialized. Furthermore, in S141, the sleep timer (the first count timer 16) is set to 3 minutes. In S142, the operation mode is set to the normal mode. Thereafter, the processing flow returns to S106 to check the operation mode.

In a case where it is determined in S120 that no change in the output voltage V of the human sensor 10 is detected or leaving of a person is detected aroma change in the output voltage V, it is checked whether the sleep key 135 is pressed (S122). In a case where the sleep key 135 is pressed (ON in S122), the processing flow proceeds to S121 in which the main power supply (the first power supply 140) is turned on (S121). After the main power supply (the first power supply 140) is turned on in S121, the set values in the operation unit 12 are initialized (S140). Thereafter, the sleep timer (the first count timer 16) is set to 3 minutes (S141), and the operation mode is set to the normal mode (S142). Thereafter, the processing flow returns to S106 to check the operation mode.

On the other hand, in a case where pressing of the sleep key 135 is not detected in S122 (OFF in S122), the processing flow returns to S106 to check the operation mode.

Transition To Sleep Mode

In a case where it is determined in S106 that the operation is in the "transition-to-sleep" state, a detection (the output voltage V) of the human sensor 10 is checked (S130). In a case where it is determined that no change in the output voltage of the human sensor 10 is detected or leaving of person is detected, the processing flow proceeds to S114 to check whether the sleep timer (the first count timer 16) has expired. In a case where the sleep timer is up, the processing flow proceeds to S116 from S115. In a case where the sleep timer is not yet up, the process in S117 and S118 is performed. Thereafter, the processing flow returns to S106 to check the operation mode.

On the other hand, in a case where it is determined in S130 that approaching of a person is detected by the human sensor 10, the processing flow proceeds to S141 in which the sleep timer (the first count timer 16) is set to 3 minutes. Thereafter, in S142, the operation mode is set to the normal mode. Thereafter, the processing flow returns to S106 to check the operation mode.

In the present embodiment, the sleep mode is cancelled when one of the following conditions is met: (1) approaching of a person is detected by the human sensor; and (2) the sleep cancel key (the sleep key 135) is pressed.

The image forming apparatus can be in one of the following modes or states: (A) normal mode; (B) transition state from the normal mode to the sleep mode; and (C) sleep mode. When some key is pressed in the state of (A) or (B) (when an operation of pressing a key is detected in S117), the set time of the timer for counting down before entering the sleep mode is extended (S141). In a case where it is determined that no operation is performed in a predetermined period or it is determined that no approaching of a person is detected, the operation enters the sleep mode (S116). In a case where the sleep key 135 is pressed (the sleep key is pressed in S117), the operation is immediately brought in the sleep mode (S116).

Only in a case where a person leaving the image forming apparatus is detected by the human sensor 10 (see FIG. 3D) (leaving is detected in S110), the operation goes to the "transition-to-sleep) state. In this case, the set time of the timer is set to 1 minute (S111). However, the set time is set to 3 minutes that is to be counted in a state in which any key other than the sleep key is not operated before executing the switching to the sleep mode (S105, S141). Thus, even in a case where the human sensor 10 fails to detect a person leaving because of a disturbance or the like, the operation goes to the sleep mode after a lapse of predetermined time.

Other Embodiments

Figure 6A:
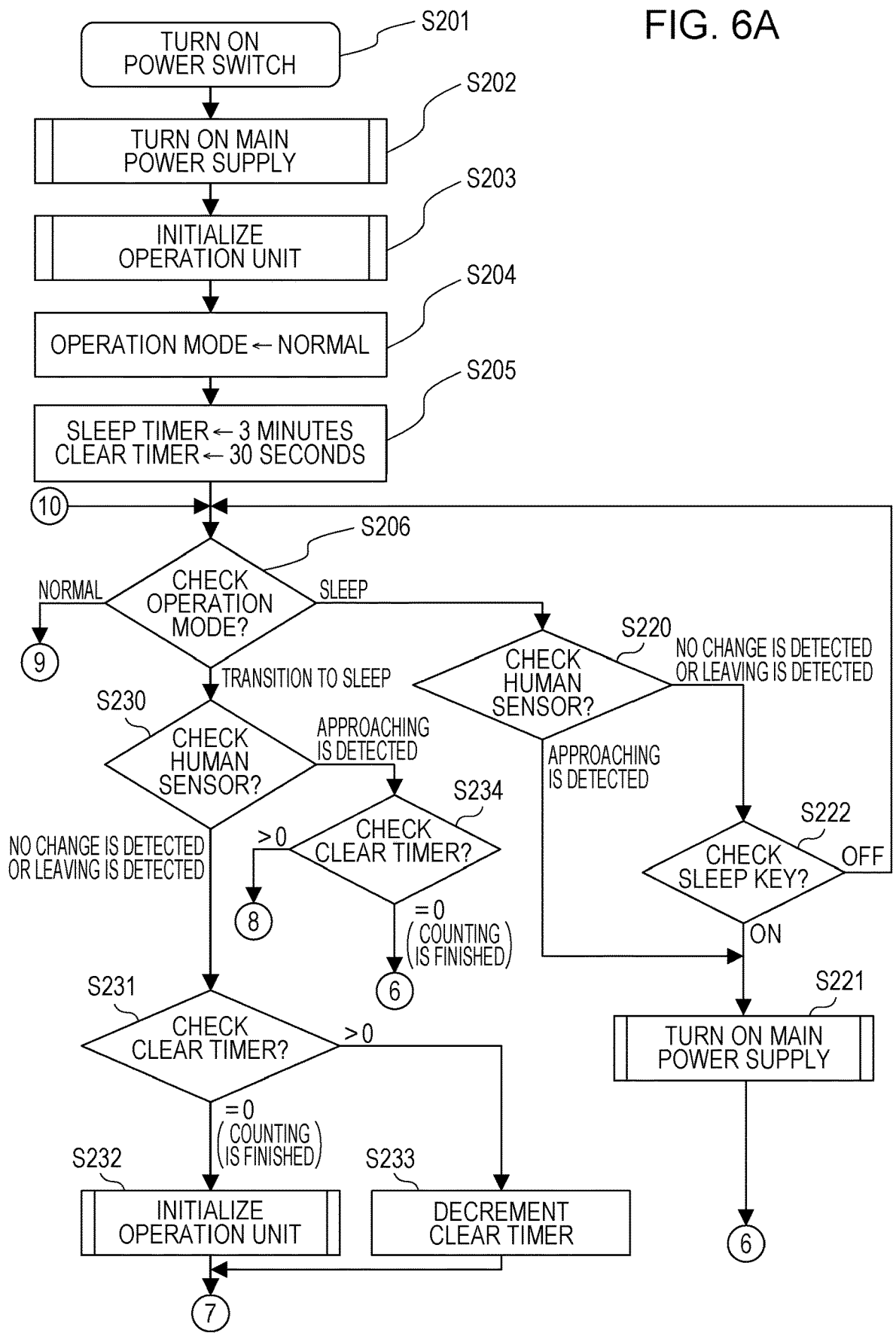

FIGS. 6A and 6B are flow charts illustrating a control operation according to another embodiment.

In this embodiment shown in FIGS. 6A and 6B, the clear timer 20 (see FIG. 4) is provided for counting a time from when the human sensor 10 no longer detects a human body or the human sensor 10 detects an operator (a human body) approaching until when a setting of the operation unit 12 is cleared (S231, S233). When the count value of the timer in the transition-to-sleep state reaches zero, the current settings of the operation are cleared (S232). When approaching of a human body is detected by the human sensor 10, the count value of the clear timer is checked (S234), and if the count value has not yet reached the expiration value (the count value>0 in S234), then the processing flow proceeds to S241 in which the sleep timer is set to 3 minutes and the clear timer is set to 30 seconds. Thereafter, the processing flow proceeds to S242 and the operation mode is set to the normal mode. On the other hand, in a case where the counting is finished (the count value=0 in S234), the processing flow proceeds to S240, and the setting values of the operation unit 12 are initialized.

More specifically, in the present embodiment, as shown in the flow chart of FIGS. 6A and 6B, first, the power switch is turned on (S201) thereby turning on the first power supply 140 and the second power supply 142 (S202). The operation unit 12 is initialized (S203), the operation mode is set to the normal mode (S204), and the sleep timer is set to 3 minutes and the clear timer 20 is set to 30 seconds (S205). In this case, the first set time t1 of the first count timer 16 used as the sleep timer is set to 3 minutes, and the clear timer 20 is set to 30 seconds.

Next, a determination is made as to whether the operation is in the normal mode, in the sleep mode, or in the transition-to-sleep state (S206). In a case where it is determined that the operation is in the normal mode, the processing flow proceeds to S210. In a case where it is determined that the operation is in the sleep mode, the processing flow proceeds to S220. In a case where it is determined that the operation is in the transition-to-sleep state, the processing flow proceeds to S230.

Operation When Normal Mode is Detected in S206

In a case where the processing flow proceeds to S210 in response to the determination that the operation is in the normal mode, a check is performed as to an occurrence of a change in the output voltage V of the human sensor 10. If the result of the check in S210 indicates that leaving of a person is detected by the human sensor 10, then the set time of the sleep timer is set to 1 minute and the clear timer 20 is set to 30 seconds (S211). Thus, the second set time t2 of the second count timer 18 on the CPU is set to 1 minute and the set time tc of the clear timer 20 is set to 30 seconds.

Thereafter, the operation mode is set to the transition-to-sleep state (S212). Thereafter, the processing flow returns to S206 to check the operation mode.

On the other hand, in a case where no change in the output voltage V of the human sensor 10 is detected in S210, a check is made as to whether the sleep timer has expired (whether the first set time t1 of 3 minutes of the first count timer has expired) (S213).

In a case where it is determined in S213 that the sleep timer has expired (the sleep timer is up and the sleep timer has no remaining time), the first power supply 140 of the main power supply is turned off (S214). The operation mode is then set to the sleep mode (S215). In the sleep mode, as shown in FIG. 4, the control unit 14 is supplied with power only from the second power supply 142 and the CPU operates in the power save mode, and the second power supply 142 supplies power to the sleep key 135, the LED of the sleep key, and the human sensor 10. Thereafter, the processing flow returns to S206.

On the other hand, in a case where it is determined in S213 that the sleep timer has not yet expired (that is, the sleep timer is not up) and the sleep timer still has a remaining time, a check is made as to an occurrence of a key operation (S216). In a case where a key operation of pressing the sleep key 135 is detected, the processing flow proceeds to S214 in which the main power supply (the first power supply 140) is turned off, and the operation mode is set to the sleep mode in S215. Thereafter, the processing flow returns to S206.

In a case where no key operation is detected in S216, the sleep timer is decremented (S217). Thereafter, the processing flow returns to S206.

In a case where it is determined in S216 that a key operation of another key (one of keys other than the sleep key 135) is detected, the processing flow proceeds to S241 in which the sleep timer is set to 3 minutes (the first set time t1 of the first count timer is set to 3 minutes) and the clear timer 20 is set to 30 seconds. In S242, the operation mode is set to the normal mode. Thereafter, the processing flow returns to S206.

Operation When Sleep Mode is Detected in S206

In a case where it is determined in S206 that the operation is in the sleep mode, a check is performed as to the detection by the human sensor 10 (S220). In a case where approaching of a person is detected by the human sensor 10, the main power supply (the first power supply 140) is turned on (S221). Thereafter, the processing flow proceeds to S240, and the setting values of the operation unit are initialized. Thereafter, in S241, the sleep timer is set to 3 minutes and the clear timer 20 is set to 30 seconds. In S242, the operation mode is set to the normal mode.

In a case where it is determined in S220 that no change in the output of the human sensor 10 is detected or leaving of a person is detected, it is checked whether the sleep key 135 is pressed (S222). In a case where pressing of the sleep key 135 is detected in S222, the processing flow proceeds to S221 in which the main power supply (the first power supply 140) is turned on (S221). After the main power supply (the first power supply 140) is turned on in S221, the processing flow proceeds to S240, and the operation unit is initialized.

On the other hand, in a case where pressing of the sleep key 135 is not detected in S222 the processing flow returns to S206.

Operation when Transition-to-Sleep State is Detected in S206

In a case where it is determined in S206 that the operation is in the transition-to-sleep state, the detection by the human sensor 10 is checked by checking the output voltage V of the human sensor 10 (S230). In a case where it is determined in S230 that no change in the output voltage V of the human sensor 10 is detected or leaving of a person is detected, the processing flow proceeds to S231 to check whether the counting by the clear timer 20 is finished. In a case where it is determined in S231 that the counting by the clear timer 20 is finished (the count value=0 in S231), the set values in the operation unit 12 are initialized (S232). Thereafter, the processing flow proceeds to S213 to check whether the counting by the sleep timer is finished.

On the other hand, in a case where it is determined in S231 that the counting by the clear timer 20 is not yet finished (the count value>0), the processing flow proceeds to S233 in which the count value of the clear timer 20 is decremented. Thereafter, the processing flow proceeds to S213.

In the present embodiment, in a case where before the clear timer 20 expires, the human sensor 10 detects a human body in the same direction as a previous direction in which a human body was detected, the settings of the operation unit 12 are not cleared. On the other hand, in a case where the human sensor 10 detects a human body in a direction different from a previous direction in which a human body was detected, the settings of the operation unit 12 are cleared.

In the image forming apparatus according to an embodiment, human sensors are disposed at a right-hand position and a left-hand position. After a human body is detected by one of the human sensors located at the right-hand or left-hand position, if a human body approaching in the same direction as the previous direction is detected, the human body is likely to be same user as the previous user. In this case, maintaining the setting of the operation unit without clearing may provide better convenience to the user. On the other hand, after a human body is detected by one of the human sensors located at the right-hand or left-hand position, if a human body approaching in a direction different from the previous direction is detected, the human body is likely to be a user different from the previous user. In this case, clearing the setting of the operation unit may provide better convenience to the new user such that the new user is allowed to use the apparatus in a manner he/she wants.

In the example described above, when the clear timer 20 expires (S234), the setting is immediately cleared (S240). When the human sensor 10 detects a human body before the clear timer 20 expires, the setting may not be cleared immediately but a message may be di played to ask users whether the setting of the operation unit 12 is to be cleared. In this situation, if an operation for clearing is performed (for example, by pressing the clear key), the setting may be cleared.

This provides better convenience to users in a situation in which a user wants to select whether the setting is cleared or not depending on whether the user wants to use the image forming apparatus with the same setting as the previous setting. Furthermore, the capability of allowing users to select whether the setting is to be cleared or not provides better convenience to users in a situation in which a user different from a previous user wants to use the image forming apparatus with the same setting as the previous setting.

In the present embodiment, as in S211, the set time (for example, 30 seconds) in the clear timer 20 is shorter than the second set time (for example, 1 minute) in the second count timer 18.

This provides convenience to users in a situation in which when a user leaves the apparatus for a short time, for example, to take paper or a document, the setting of the operation unit is not cleared, but when a user definitely leaves the apparatus, the setting of the operation unit is cleared and the operation is brought into the sleep mode.

The present disclosure has been described above with reference to embodiments. However, these embodiments are merely examples, and various modifications are possible. In the embodiments, the first count timer, the second count timer, and the clear timer are respectively set to 3 minutes, 1 minute, and 30 seconds. These values are merely examples, and various values may be employed.

The image processing apparatus according to the present disclosure may be used in a digital copying machine and an image forming apparatus having a printer function or a facsimile function.

The present disclosure contains subject matter related to that disclosed in Japanese Priority Patent Application JP 2018-076931 filed in the Japan Patent Office on Apr. 12, 2018, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An image processing apparatus comprising:
    a human sensor that detects a human body;
    operation circuitry for performing various settings; and
    control circuitry capable of switching an operation mode between a normal mode in which image processing is performed and a sleep mode in which consumption power is saved,
    the image processing apparatus further comprising:
    a first count timer that, in a case where no inputting from the operation circuitry occurs in a first set time set in the first count timer, the control circuitry switches from the normal mode to the sleep mode;
        wherein in a case where a human body is detected as approaching by the human sensor, the control circuitry switches from the sleep mode to the normal mode,
        and wherein in the normal mode, in a case where the human sensor no longer detects a human body or the human sensor detects a human body leaving, the control circuitry clears a setting of the operation circuitry and starts counting down a second set time set in a second count timer for switching from the normal mode to the sleep mode, and
            wherein the first set time and the second set time are different each other and the first set time is longer than the second set time.

2. The image processing apparatus according to claim 1, wherein
    in a case where the human sensor no longer detects a human body or the human sensor detects a human body leaving,
    a clear timer for clearing a setting of the operation circuitry starts, and the second count timer also starts counting,
    when the clear timer finishes counting, the setting of the operation circuitry is cleared.

3. The image processing apparatus according to claim 2, wherein
    in a case where before the clear timer is up, the human sensor detects a human body in the same direction as a previous detection direction, the setting of the operation circuitry is not cleared,
    while in a case where the human sensor detects a human body in a direction different from a previous detection direction, the setting of the operation circuitry is cleared.

4. The image processing apparatus according to claim 2, wherein
    in a case where before the clear timer is up, the human sensor detects a human body, a message is displayed to ask whether the setting of the operation circuitry is to be cleared, and
    in a case where an inputting operation to instruct to clear the setting is performed, the setting is cleared.

5. The image processing apparatus according to claim 2, wherein the set time in the clear timer is shorter than the set time in the second set time.

6. A method of controlling an image processing apparatus including a human sensor that detects a human body, an operation unit for performing various settings, and a control unit capable of switching between a normal mode in which an image processing is performed and a sleep mode in which consumption power is saved, the method comprising:
    in a case where no inputting from the operation unit occurs in a first set time, switching from the normal mode to the sleep mode;
    in a case where the human sensor detects a human body approaching, switching from the sleep mode to the normal mode; and
    in the normal mode, in a case where the human sensor no longer detects a human body or the human sensor detects a human body leaving, clearing a setting of the operation unit and starting counting down a second set time set for switching from the normal mode to the sleep mode,
    wherein the first set time and the second set time are different each other and the first set time is longer than the second set time.

* * * * *